United States Patent [19]

Perrulli

[11] Patent Number: 5,950,569

[45] Date of Patent: *Sep. 14, 1999

[54] HANDS FREE DOG LEASH

[75] Inventor: Joseph T. Perrulli, Pound Ridge, N.Y.

[73] Assignee: Commonwealth Industries, Inc., Burlington, Mass.

[*] Notice: This patent is subject to a terminal disclaimer.

[21] Appl. No.: 09/198,474

[22] Filed: Nov. 24, 1998

Related U.S. Application Data

[63] Continuation of application No. 08/987,358, Dec. 9, 1997, Pat. No. 5,842,444, and a continuation of application No. 29/080,418, Dec. 9, 1997, Pat. No. Des. 407,866
[60] Provisional application No. 60/032,476, Dec. 9, 1996.
[51] Int. Cl.$^6$ ............................. A01K 27/00; A62B 35/00
[52] U.S. Cl. ............................. 119/770; 119/792; 119/857
[58] Field of Search ..................................... 119/770, 792, 119/795, 797, 857, 856; 182/3, 4

[56] References Cited

U.S. PATENT DOCUMENTS

| | | | |
|---|---|---|---|
| D. 350,628 | 9/1994 | Williams | D30/153 |
| 3,004,519 | 10/1961 | Weissman | 119/857 |
| 3,491,726 | 1/1970 | Partin | 119/770 |
| 3,721,216 | 3/1973 | Lippe et al. | 482/81 |
| 4,324,204 | 4/1982 | Friedman | 119/771 |
| 4,667,624 | 5/1987 | Smith | 119/770 |
| 4,860,560 | 8/1989 | Lundelius | 70/16 |
| 4,945,861 | 8/1990 | De Koning | 119/795 |
| 5,038,719 | 8/1991 | McDonough | 119/772 |
| 5,080,045 | 1/1992 | Reese et al. | 119/795 |
| 5,161,486 | 11/1992 | Brown | 119/795 |
| 5,551,379 | 9/1996 | Hart | 119/771 |
| 5,718,189 | 2/1998 | Blake | 119/770 |

FOREIGN PATENT DOCUMENTS

| | | | |
|---|---|---|---|
| 2700442 | 7/1994 | France | 119/856 |

OTHER PUBLICATIONS

Oregon Trail Group, Inc., Website, 3 pages, at least by Jun. 6, 1997.
"More Information About DogRunner®", Website, 6 pgs., at least by Jun. 6, 1997.
"Walk–A–Dog™ Hands–Free Leash Belt", one page, at least by Nov. 26, 1997.
Spirit Dog®, "Length–Adjustable Leash", one page, at least by Nov. 26, 1997.
Drawing, Innovative Sports Product Group, PuppyPull™ dog leash claimed to be sold since 1990.

*Primary Examiner*—Michael J. Carone
*Assistant Examiner*—James S. Bergin
*Attorney, Agent, or Firm*—Hamilton, Brook, Smith & Reynolds, P.C.

[57] ABSTRACT

An apparatus for restraining an animal includes a belt capable of being worn about the torso of a person. The belt has interior and exterior surfaces. A slide member formed from a length of flexible substantially non-stretchable material has two ends secured to the exterior surface of the belt. A slide member extends along a substantial length of the exterior surface of the belt in adjacent parallel relationship to the belt. A coupling member is slidably mounted along the slide member. The apparatus includes a lead having proximal and distal ends with respect to the person's torso. The distal end is securable to the animal and the proximal end is securable to the coupling member. Sliding of the coupling member along the slide member allows the lead to slide a substantial distance relative to the belt so that the animal can move a substantial distance about the person.

13 Claims, 4 Drawing Sheets

HANDS FREE DOG LEASH

RELATED APPLICATIONS

This application is a continuation of U.S. patent application Ser. No. 08/987,358, filed on Dec. 9, 1997, now U.S. Pat. No. 5,842,444, and U.S. Design application Ser. No. 29/080,418, filed on Dec. 9, 1997, now U.S. Pat. No. D407866, which claim the benefit of U.S. Provisional Application No. 60/032,476, filed on Dec. 9, 1996, the entire teachings of which are incorporated herein by reference.

BACKGROUND OF THE INVENTION

People walking or jogging with their dog often restrain the dog with a hand-held leash. Such a leash can be inconvenient for both the person and the dog, especially when jogging. Shifting of the dog from side to side forces the person jogging to constantly switch the leash from hand to hand. This can break the rhythm of the person jogging particularly when the dog attempts to cross in front of that person. A hand-held leash can also be stressful on the dog since the natural swinging of a person's arms while jogging can suddenly jerk and pull on the dog's collar. In situations where a person walks a dog while pushing a baby stroller, the person will sometimes tie the hand-held leash to the stroller. Although this frees the person's hands to push the stroller, it can be a safety hazard, especially if the dog becomes agitated and attempts to suddenly run.

SUMMARY OF THE INVENTION

The present invention provides an apparatus which allows a person walking or jogging his/her animal (usually a dog) to restrain the animal while at the same time keeping both hands free. The apparatus includes a belt capable of being worn about the torso of a person. The belt has interior and exterior surfaces. A slide member formed from a length of flexible substantially non-stretchable material has two ends secured to the exterior surface of the belt. The slide member extends along a substantial length of the exterior surface of the belt in adjacent parallel relationship to the belt. A coupling member is slidably mounted along the slide member. The apparatus includes a lead having proximal and distal ends with respect to the person's torso. The distal end of the lead is securable to the animal and a proximal end is securable to the coupling member. Sliding of the coupling member along the slide member allows the lead to slide a substantial distance relative to the belt so that the animal, attached to the lead, can freely move a substantial distance about the person while still being restrained.

In preferred embodiments, the slide member is a flexible flat fabric strap having a moment of inertia sufficient to prevent substantial sagging. The slide member extends along about one-half the exterior surface of the belt such that the coupling member and lead can slide along the slide member for an arc of about 180° around the belt. The belt further includes a quick release buckle for securing the belt around the person's torso and an adjustment member for adjusting the length of the belt. Reflective material is located on the exterior surface of the slide member enabling the user to be seen by drivers at night. Rubber stitching is provided on the interior surface of the belt for preventing the belt from slipping during use.

The present invention apparatus allows a person to restrain an animal in a hands free manner while at the same time enabling the animal to move behind the person from one side to the other. This enables the restrained animal to choose between traveling along either side of the person or following behind the person. The present invention promotes proper training for dogs because the dog must keep pace with the person while traveling behind or beside the person.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
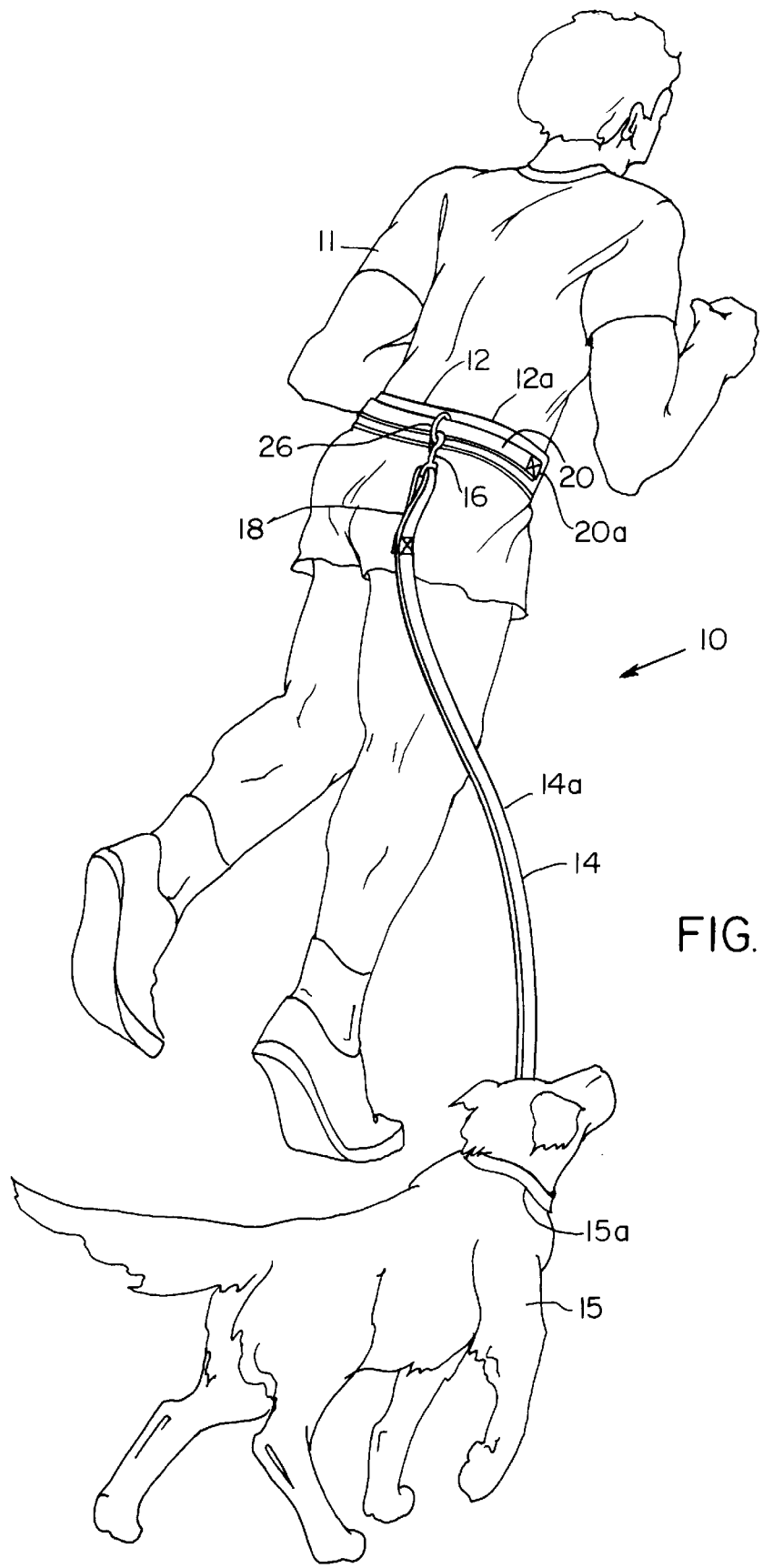
FIG. 1 is a perspective view of a person jogging while restraining a dog with the present invention dog leash.
Figure 2:
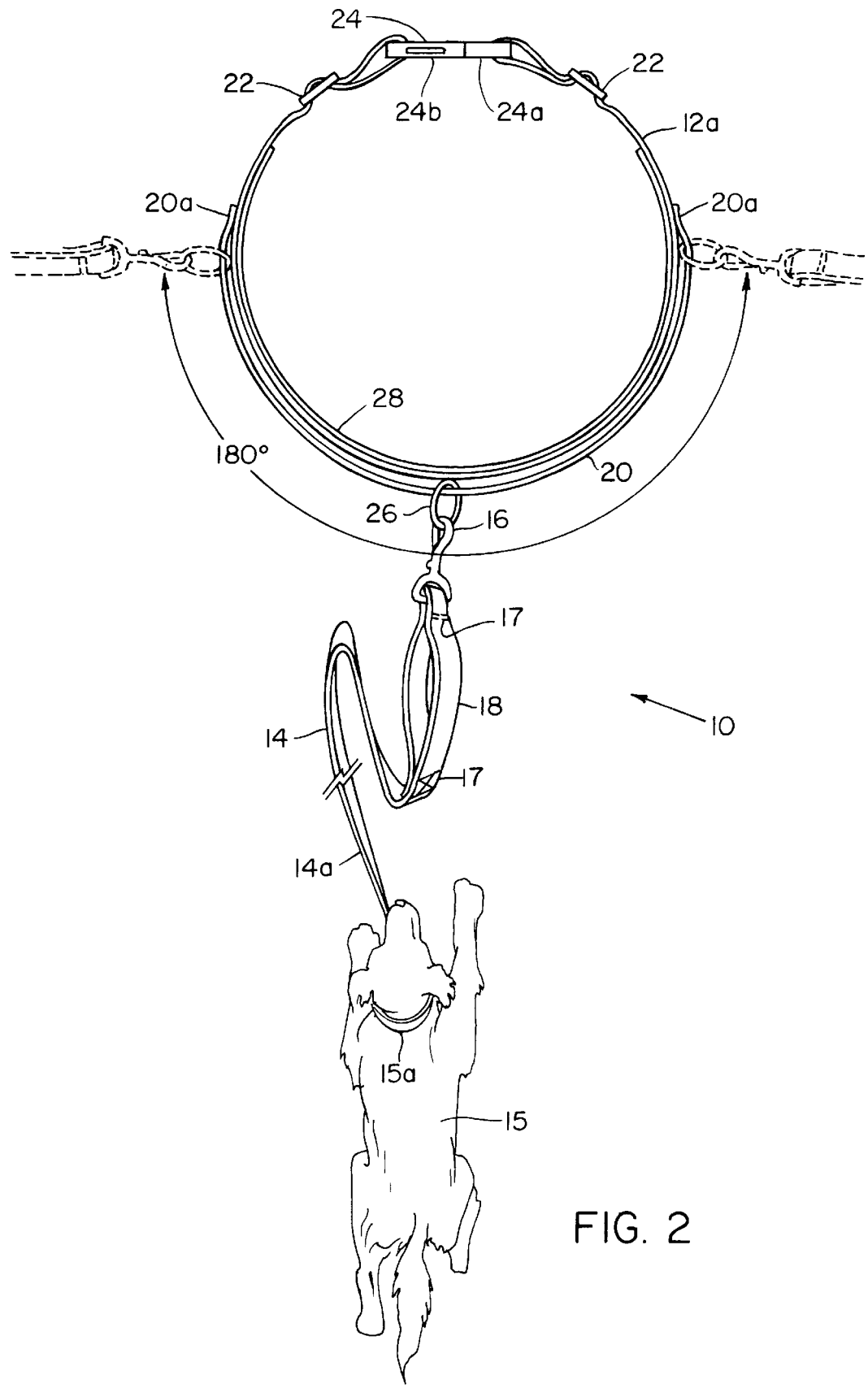
FIG. 2 is a top view of the dog restrained by the present invention leash with the belt buckled together.
Figure 3:
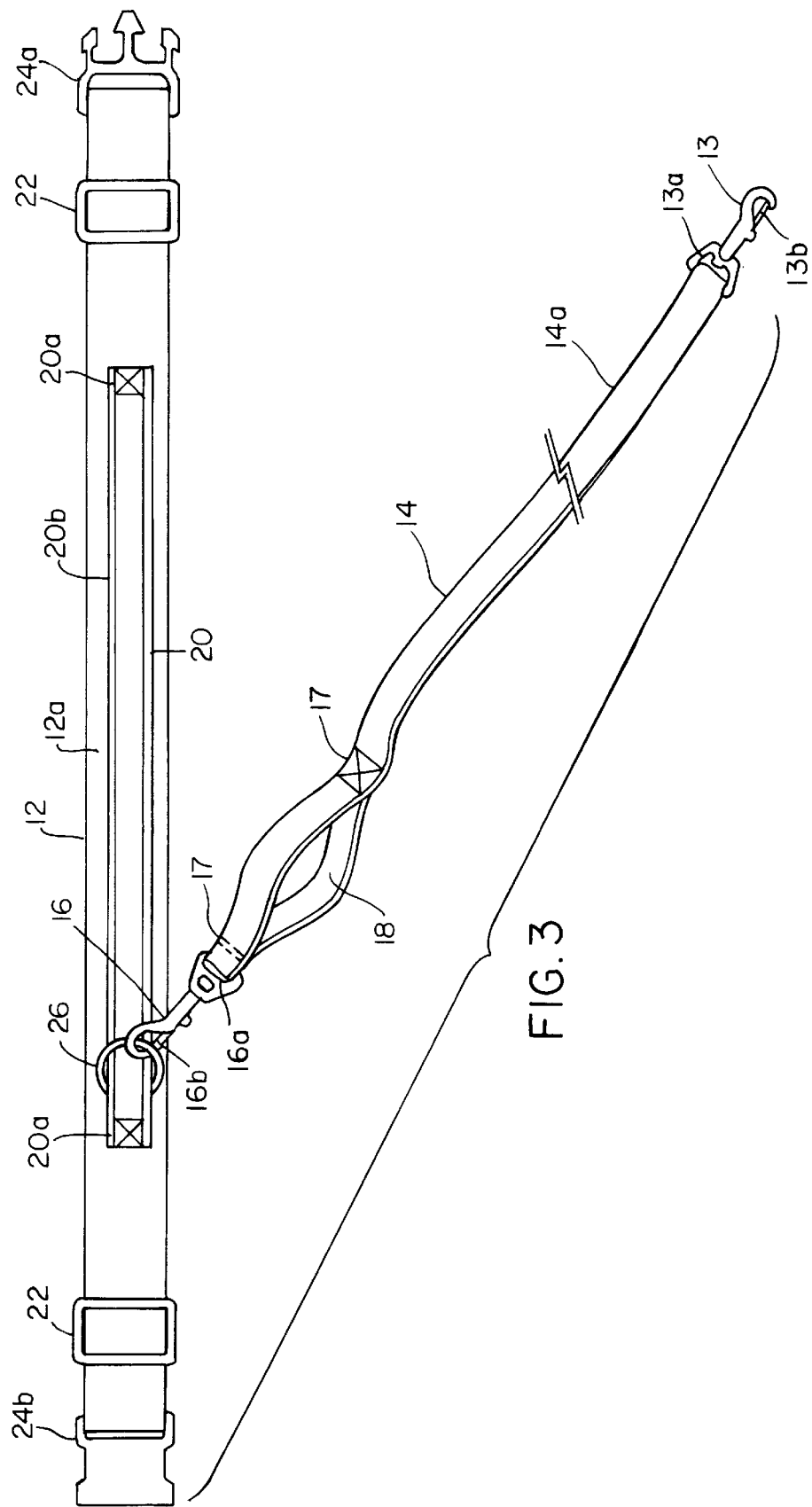
FIG. 3 is a side view of the present invention leash with the belt unbuckled.

Referring to FIGS. 1, 2 and 3, a dog 15 is restrained by present invention dog leash 10. Leash 10 includes a belt 12 which is worn about the waist of a person 11 and a lead 14 for securing to dog 15. The lead 14 is slidably coupled to the belt 12 at one end and secured to the collar 15a of the dog 15 at the other end. Belt 12 includes a flexible waistband 12a which is coupled together with a quick release buckle 24. Buckle 24 has a male portion 24b secured to one end of waistband 12a and a female portion 12a secured to the other end of waistband 12a. Two self-locking adjustment members 22 are positioned on opposite sides of buckle 24 for adjusting the length of waistband 12a. A flexible outer sliding band 20 is secured at its ends 20a to waistband 12a and extends along about half the length of waistband 12a in close adjacent relationship with waistband 12a. A sliding ring 26 is slidably mounted along sliding band 20 for slidably coupling lead 14 to belt 12. Lead 14 consists of a flexible strap 14a with spring loaded quick release connectors 16 and 13 positioned at opposite ends of lead 14. The quick release connectors 16 and 13 allow lead 14 to be releasably coupled to sliding ring 26 on belt 12 and to collar 15a on the dog 15.

In use, belt 12 is secured to the human user's 11 waist by inserting male portion 24b of buckle 24 into the female portion 24a. If waistband 12a does not fit properly, the length of waistband 12a can be adjusted with adjustment members 22. Belt 12 is worn with buckle 24 in front and the sliding band 20 in the rear. The distal end of lead 14 is secured to the collar 15a worn by dog 15 with quick release connector 13. The proximal end of lead 14 is then connected to sliding ring 26 on belt 12 by quick release connector 16. Once the lead 14 is secured to belt 12, the user can walk or jog without having to hold a dog leash in the hand. This allows the user to push a carriage, hold hand weights or carry items while walking or running with the dog 15. Sliding band 20 extends at least halfway around belt 12 such that the dog 15 can travel along either side of the user as well as move behind the user to shift from one side of the user to the other side. When dog 15 moves around the user, sliding ring 26 is pulled along sliding band 20 by lead 14 and can travel from one end 20a of sliding band 20 to the other end 20a. Since the dog 15 either follows behind or to the side of the user, there is little chance that the dog 15 will cross in front of the user causing the user to break stride or trip. In addition, it is proper dog training technique for the dog to follow the master rather than to lead.

A more detailed description of the present invention now follows. Waistband 12a is preferably formed of nylon strap material 2 inches wide. At this width, the waistband 12a does not dig into the waist of the user when dog 15 pulls on lead 14 and at the same time does not restrict the user's freedom of movement. Although a quick release buckle 24 is preferably used, other suitable methods of securing belt 12 about the waist can be employed such as standard style belt buckles, cam lock buckles etc. When a standard style or cam lock buckle is employed, adjustment members 22 are not necessary.

Sliding band 20 is formed from substantially nonstretchable nylon strap material. Sliding band 20 is sewn to waistband 12a at opposite ends 20a of sliding band 20 and extends along about half the length of waistband 12a in adjacent parallel relationship. Sliding band 20 is preferably about 19 inches long, 1 inch wide and 0.08 inches thick. Alternatively, the length of sliding band 20 can differ depending upon the size of the user's waist. In either case, the ends 20a of sliding band 20 should be located on opposite sides of the waist. The region of sliding band 20 between ends 20a is not secured to waistband 12a but instead is in loose contact with waistband 12a. This allows sliding ring 26 and lead 14 to slide around waistband 12a about 180° before being stopped at sewn ends 20a allowing dog 15 to travel to either side of the user (FIG. 2). The close relationship of sliding band 20 with waistband 12a as well as being made of substantially nonstretchable material allows sliding ring 26 to slide smoothly between sliding band 20 and waistband 12a along the entire length of sliding band 20. In some situations, sliding ring 26 is in contact with sliding band 20 and waistband 12 both at the same time while sliding along sliding band 20. The smooth movement of sliding ring 26 helps prevent the dog 15 from jerking the user off balance and reduces stress on the dog's neck. In addition, positioning sliding band 20 closely against waistband 12a prevents sliding band 20 from being tangled with the users clothing or from bouncing against the user when running.

By having the edge 20b of sliding band 20 facing upwardly, the area moment of inertia for the sliding band 20 is much higher than if the flat surface of sliding band 20 were to face upwardly. This provides sliding band 20 with structural rigidly in the vertical direction to prevent the sliding band 20 from sagging. The moment of inertia of sliding band 20 in the preferred embodiment is preferably about 0.007 in$^4$. The adjacent relationship of sliding band 20 to waistband 12a prevents sliding band 20 from twisting so that edge 20b always faces upwardly. A reflective material is preferably sewn to the outer surface of sliding band 20 so that the user can be seen by cars at night. Although sliding band 20 is preferably flat, sliding band 20 can also have a circular cross section such as with rope. Sliding ring 26 is preferably a circular steel ring with a 1 inch diameter, but alternatively, can have other suitable shapes, for example, oval or "D" shaped, or can be made of other suitable materials such as other metals or plastic. In addition, although the reflective material is preferably located on sliding band 20, alternatively, the reflective material can be located on the waistband 12a, buckle 24 or lead 14, individually or in combination.

Lead 14 is preferably formed from 1 inch wide nylon strap material 14a between about 4 and 5 feet long. Quick release connectors 16 and 13 each have a closed loop portion 16a and 13a which are secured to the lead 14. Quick release connectors 16 and 13 each also have a openable portion 16b and 13b for securing to the sliding ring 26 and the dog collar 15a. Openable portions 16b and 13b consist of an open hook with a spring loaded sliding pin for closing the hook. Alternatively, other suitable commercially available quick release connectors can be employed. The proximal end of lead 14 includes a loop 18 enabling the user to hold directly onto lead 14 for better control of the dog. Loop 18 also enables lead 14 to be employed as a conventional dog leash. Stitching 17 secures quick release connector 16 to lead 14 and forms loop 18. Although a quick release connector 16 and a loop 18 are preferably employed at the proximal end of lead 14, alternatively, quick release connector 16 and loop 18 can be omitted with lead 14 being secured directly to sliding ring 26.

Figure 4:
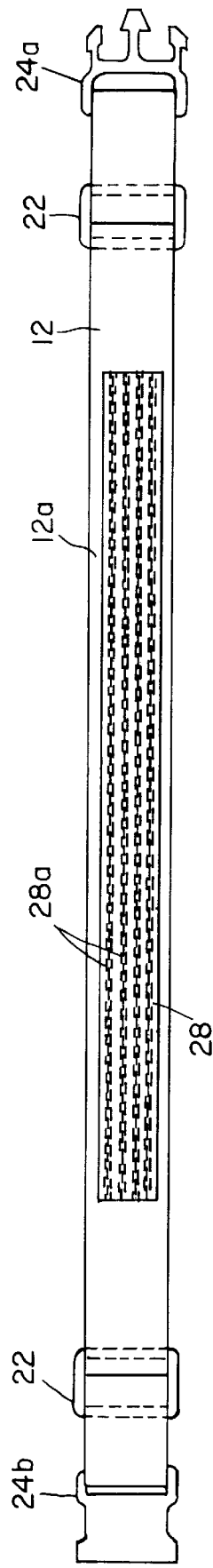
FIG. 4 is a side view of the inner surfaces of the belt with the belt unbuckled.

Referring to FIG. 4, the inner surface of waistband 12a preferably has a web 28 of rubber stitch material 28a secured thereon. The web 28 is glued to waistband 12a and sewn at the ends. The rubber stitch material 28a helps prevent waistband 12a from slipping on the user's waist when the dog 15 moves about, even on slippery clothing made of materials such as nylon. It is important for waistband 12a not to slip so that the restraint points of ends 20a on sliding band 20 do not become altered. If the waistband 12a slips enough, the dog 15 can travel in front of the user, possibly tripping the user. In addition, if the user is running, a dog straining on lead 14 in front of the user can easily pull the user off balance. In the preferred embodiment, web 28 is about 1¼ inches wide and 19 inches long. Web 28 has four rows of rubber stitching 28a. Each row of rubber stitching 28a is three stitches wide. Alternatively, the rubber stitching 28a can be applied directly onto the inner surface of waistband 12a. In addition, more than four rows or less than four rows of rubber stitching 28a can be employed. Furthermore, regions of rubber stitching 28a can be applied intermittently along waistband 12a.

Figure 5:
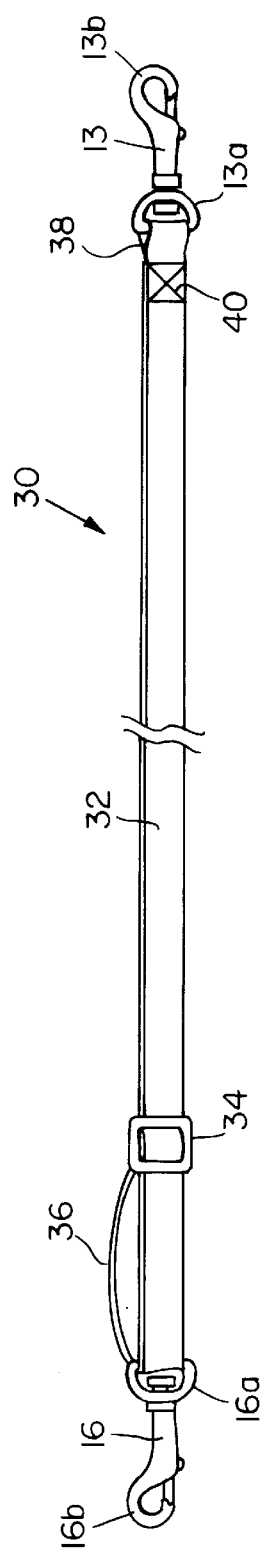
FIG. 5 is a side view of another preferred lead.

Referring to FIG. 5, lead 30 is another preferred lead for coupling to sliding ring 26 of belt 12. Lead 30 differs from lead 14 in that a self-locking adjustment member 34 is included at the proximal end of strap 32 for adjusting the length of lead 30. The adjustment member 34 also forms a loop 36 similar to loop 18 on lead 14. The size of loop 36 changes as the length of lead 30 is adjusted. Quick release connector 16 is slidably secured to loop 36 to compensate for changes in the size of loop 36. Quick release connector 13 is secured to the distal end of lead 30 by a loop 38 of elastic material. Elastic loop 38 is secured to strap 32 by stitching 40 and reduces shock to the human user as well as on the dog's 15 neck when dog 15 suddenly jerks on lead 30. Without elastic loop 38, such jerking can cause the human user to lose his/her balance or cause the dog to experience stress on its neck. Although elastic material is preferably located at the distal end of lead 30, alternatively, a length of elastic material can be located anywhere along lead 30 for absorbing shock.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, although waistband 12a, sliding band 20 and lead 14 are preferably made of nylon strap material, alternatively, other suitable light weight flexible materials can be used such as other fabrics, natural leather, synthetic leather, etc. In addition, although the present invention is preferably for use with dogs, alternatively, it can be used with other animals such as cats or even used for children. Furthermore, although specific dimensions have been described for the present invention leash, alternatively, the actual dimensions can vary to accommodate different sized human users.

What is claimed is:

1. A restraining apparatus comprising:

a belt capable of being worn about the torso of a first mammal, the belt having interior and exterior surfaces, a slide member formed from a length of flexible material having two ends secured to the exterior surface of the belt, the slide member extending along a substantial length of the exterior surface of the belt in adjacent parallel relationship to the belt, a coupling member being slidably mounted along the slide member; and a lead having proximal and distal ends with respect to the first mammal torso, the distal end being securable to a second mammal and the proximal end being securable to the coupling member, sliding of the coupling member along the slide member allowing the lead to slide a substantial distance relative to the belt so that the second mammal can move a substantial distance about the first mammal.

2. The apparatus of claim 1 in which the slide member comprises a flat fabric strap having a moment of inertia sufficient to prevent substantial sagging.

3. The apparatus of claim 1 in which the slide member extends along about one-half the exterior surface of the belt.

4. The apparatus of claim 3 in which the coupling member is capable of sliding along the slide member around the belt for an arc of about 180°.

5. The apparatus of claim 1 in which the lead includes a section of elastic material for absorbing shock from movements of the animal.

6. The apparatus of claim 1 in which the lead includes an adjustment member for adjusting the length of the lead.

7. The apparatus of claim 1 in which the belt further comprises a quick release buckle.

8. The apparatus of claim 7 in which the belt further comprises an adjustment member for adjusting the length of the belt.

9. The apparatus of claim 1 further comprising reflective material located on the slide member.

10. The apparatus of claim 1 further comprising rubber material located on the interior surface of the belt for preventing the belt from slipping during use.

11. The apparatus of claim 10 in which the rubber material is rubber stitching.

12. The apparatus of claim 11 in which the rubber stitching is mounted to the interior surface of the belt.

13. A method of restraining comprising the steps of:

securing a belt about the torso of a first mammal, the belt having interior and exterior surfaces, a slide member formed from a length of flexible material having two ends secured to the exterior surface of the belt, the slide member extending along a substantial length of the exterior surface of the belt in adjacent parallel relationship to the belt, a coupling member being slidably mounted along the slide member;

providing a lead having proximal and distal ends with respect to the first mammal's torso;

securing the distal end of the lead to a second mammal; and securing the proximal end of the lead to the coupling member, sliding of the coupling member along the slide member allowing the lead to slide a substantial distance relative to the belt so that the second mammal can move a substantial distance about the first mammal.

* * * * *